United States Patent [19]
Geiger et al.

[11] Patent Number: 5,804,156
[45] Date of Patent: Sep. 8, 1998

[54] IRON CARBIDE PROCESS

[75] Inventors: Gordon H. Geiger, Minneapolis, Minn.; Arden W. Swanson, North Olmsted, Ohio; Frank A. Stephens; Frank M. Stephens, Jr., both of Lakewood, Colo.

[73] Assignee: Iron Carbide Holdings, Ltd., Lakewood, Colo.

[21] Appl. No.: 684,408

[22] Filed: Jul. 19, 1996

(Under 37 CFR 1.47)

[51] Int. Cl.$^6$ .................................................. C01B 31/30
[52] U.S. Cl. ............................................................ 423/439
[58] Field of Search ..................................... 423/439, 440

[56] References Cited

U.S. PATENT DOCUMENTS

| | | |
|---|---|---|
| Re. 32,247 | 9/1986 | Stephens, Jr. . |
| 1,775,713 | 9/1930 | Baily . |
| 1,786,386 | 12/1930 | Ashcroft . |
| 2,535,042 | 12/1950 | Cohn et al. . |
| 2,538,201 | 1/1951 | Kalbach et al. . |
| 2,598,393 | 5/1952 | Kalling et al. . |
| 2,653,088 | 9/1953 | Pike . |
| 2,752,234 | 6/1956 | Shipley . |
| 2,780,537 | 2/1957 | Stelling et al. . |
| 2,806,779 | 9/1957 | Case . |
| 2,864,688 | 12/1958 | Reed . |
| 2,894,831 | 7/1959 | Old et al. . |
| 2,900,246 | 8/1959 | Keith et al. . |
| 2,921,848 | 1/1960 | Agarwal . |
| 2,978,318 | 4/1961 | Kalling et al. . |
| 3,021,208 | 2/1962 | Feinman . |
| 3,135,598 | 6/1964 | Mizushima . |
| 3,136,624 | 6/1964 | Mader et al. . |
| 3,140,168 | 7/1964 | Halley et al. . |
| 3,160,498 | 12/1964 | Olt et al. . |
| 3,288,590 | 11/1966 | Keith et al. . |
| 3,356,488 | 12/1967 | Walsh . |
| 3,364,009 | 1/1968 | Muller . |
| 3,364,010 | 1/1968 | Mayer et al. . |
| 3,364,011 | 1/1968 | Porter, Jr. et al. . |
| 3,499,755 | 3/1970 | Morris . |
| 3,502,461 | 3/1970 | Guttler et al. . |
| 3,637,368 | 1/1972 | Bessart . |
| 3,719,811 | 3/1973 | Munson . |
| 3,761,244 | 9/1973 | Hoffert . |
| 3,765,872 | 10/1973 | Celada et al. . |
| 3,885,023 | 5/1975 | Gray et al. . |
| 3,928,021 | 12/1975 | Matsybara et al. . |
| 4,042,376 | 8/1977 | Collin . |
| 4,045,214 | 8/1977 | Wetzel et al. . |
| 4,053,301 | 10/1977 | Stephens, Jr. . |
| 4,073,642 | 2/1978 | Collin et al. . |
| 4,134,907 | 1/1979 | Stephens, Jr. . |
| 4,202,534 | 5/1980 | Davis, Jr. . |
| 4,224,056 | 9/1980 | Tomizawa et al. . |
| 4,257,781 | 3/1981 | Stephens, Jr. . |
| 4,360,378 | 11/1982 | Lindstrom . |
| 4,372,755 | 2/1983 | Tolman et al. . |
| 4,398,945 | 8/1983 | Stephens, Jr. . |
| 4,420,332 | 12/1983 | Mori et al. . |
| 4,539,188 | 9/1985 | Hirsch et al. . |
| 4,676,824 | 6/1987 | Daradimos et al. . |
| 4,688,521 | 8/1987 | Korenberg . |
| 4,781,358 | 11/1988 | Langan . |
| 4,806,158 | 2/1989 | Hirsch et al. . |
| 4,841,884 | 6/1989 | Engstrom et al. . |
| 4,946,498 | 8/1990 | Weber . |
| 5,073,194 | 12/1991 | Stephens et al. . |
| 5,082,251 | 1/1992 | Whipp . |
| 5,118,479 | 6/1992 | Stephens, Jr. et al. . |

(List continued on next page.)

FOREIGN PATENT DOCUMENTS

| | | |
|---|---|---|
| 0255180 | 2/1988 | European Pat. Off. . |
| 0630975 | 12/1994 | European Pat. Off. . |
| 1247408 | of 1960 | France . |
| 1254363 | of 1967 | Germany . |
| 2401909 | of 1975 | Germany . |
| 4320359 | 10/1994 | Germany . |
| 4426623 | 7/1995 | Germany . |
| 37-11402 | of 1962 | Japan . |
| 62-230912 | 3/1986 | Japan . |
| 761570 | 10/1978 | Russian Federation . |
| 48 | 6/1994 | Trinidad/Tobago . |
| 0747584 | of 1956 | United Kingdom . |
| 0759224 | of 1956 | United Kingdom . |
| 1269842 | of 1972 | United Kingdom . |
| 1284309 | of 1972 | United Kingdom . |
| WO9202824 | 2/1992 | WIPO . |

OTHER PUBLICATIONS

"Shrinking Unreacted Core Model for Spherical Particles of Unchanging Size (SCM)" by Levenspiel, *Chemical Reaction Engineering*, 2nd Ed., Wiley & Sons (1972) no month.

Stelling, Otto, "Carbon Monoxide Reduction of Iron Ore", *Journal of Metals* pp. 290–295 (1958) no month.

Stephanopoulos, G., "Synthesis of Alternative Control Configurations for Multiple Input, Multiple Output Proceses", Prentice Hall, Ing. 1984 pp. 461–482 no month.

Handa Actal, "Layer by Layer Analysis of the Chemical State of Iron in Carburized Steel Surfaces by Conversion", pp. 1999–2002, 1961 no month.

Ochlberg, R.J. et al., "FIOR Process for Direct Reduction of Iron Ore", pp. 58–60, 1974, *Iron and Steel Engineer*, vol. 51, No. 4 Apr.

Werther, J. et al., "Metechniken fur Gas/Festoff–Wirbelschichtreaktoren", pp. 605–612, 1990 *Chemie Ingenieur Technik*, vol. 62, No. 8, Aug. 2.

*Primary Examiner*—Michael L Lewis
*Assistant Examiner*—Stuart L. Hendrickson
*Attorney, Agent, or Firm*—Sheridan Ross, P.C.

[57] ABSTRACT

A process for producing iron carbide in a fluid bed reactor in which the pressure is maintained in excess of the pressure at which the mole fraction of hydrogen in the process gas begins to decrease. The hydrogen concentration may also be increased above the equilibrium concentration for hydrogen at the temperature and pressure in the reactor. Further improvements are gained by preheating a iron ore reactor feed in which the iron oxide is primarily in the form of hematite under a reducing atmosphere, and using at least two fluid bed reactors in series.

3 Claims, 2 Drawing Sheets

U.S. PATENT DOCUMENTS

| | | |
|---|---|---|
| 5,137,566 | 8/1992 | Stephens, Jr. et al. . |
| 5,167,932 | 12/1992 | Routtu . |
| 5,192,486 | 3/1993 | Whipp . |
| 5,366,897 | 11/1994 | Hager et al. . |
| 5,370,727 | 12/1994 | Whipp . |
| 5,382,277 | 1/1995 | Rose . |
| 5,386,974 | 2/1995 | Hardie et al. . |
| 5,387,274 | 2/1995 | Dam G. et al. . |
| 5,401,295 | 3/1995 | Brotzmann . |
| 5,431,711 | 7/1995 | Miessner . |
| 5,435,831 | 7/1995 | Meissner . |
| 5,445,667 | 8/1995 | Malmstrom . |
| 5,527,379 | 6/1996 | Hirsch et al. . |
| 5,690,717 | 11/1997 | Stevens et al. ............... 423/439 |

IRON CARBIDE PROCESS

BACKGROUND OF THE INVENTION

Iron carbide is an advantageous feed component in the production of steel which avoids many of the environmental and economical drawbacks associated with conventional blast furnace and coke oven steel making processes. A charge of iron carbide and scrap can be converted directly to steel in a basic oxygen furnace, a ladle furnace, an electric arc furnace or the like, providing significant environmental and economic advantages, especially when the price of high quality scrap is high. Accordingly, the ability to economically produce large amounts of high quality iron carbide is extremely desirable.

A basic process of producing iron carbide by the reduction of iron ore involves the use of a fluidized bed reactor in which an iron oxide containing feed stock, typically comprising magnetite ($Fe_3O_4$) and hematite ($Fe_2O_3$), is reduced to iron carbide by action of a reactant gas. The reactant gas includes a reducing gas, which is typically hydrogen, and a carbon bearing gas which is typically methane. In the fluidized bed reactor the reaction results in a five component gas system in which hydrogen ($H_2$), methane ($CH_4$), carbon dioxide ($CO_2$), carbon monoxide (CO), and water ($H_2O$) exist in equilibrium. Inert gases such as nitrogen are also frequently present in the system. Attempts have been made to improve the production rate and product quality of iron carbide by controlling the reaction parameters such as temperature and pressure to effect the equilibrium gas composition in the reactor. However, there has been little success in obtaining improved results on a commercial scale.

Attempts have been made to improve the basic iron carbide process by preheating the feed stock in an oxidizing atmosphere. In the typical iron carbide process it is necessary to preheat the reactor feed in order to drive off water, which is believed to hinder the reaction, and to heat the feed to a suitable temperature. This is typically done in one or more preheating kilns or preheating cyclones. Efforts have been made to improve the preheating step by oxidizing any magnetite in the feed stock to hematite, which is believed to convert more readily to iron carbide. Although it is generally agreed that hematite has a crystalline structure conducive to the reaction, the oxidative preheat also increases the hydrogen demand in the reactor. This can be a significant limitation in a large scale production facility.

In direct reduction processes, there have also been attempts to use more than one reactor in series. Although this provides the advantages of reduced backflow and reduced likelihood of unreacted feed stock making it through the reactor, these processes have employed so called counter current gas flow, wherein the same gas and reaction conditions are used in both beds. This concept has been adapted to a single fluidized bed by the use of baffles. By approximating a plug flow reactor through channels formed by a series of baffles that prevent back-flow and intermixing between channels, one in essence creates a series of individual reactors within a single fluidized bed apparatus.

Although the foregoing processes will produce iron carbide, there is still a need to improve the process in order to make it efficient and economically advantageous on a commercial scale. In particular, there is a need to increase the efficiency, rate and throughput of the process, while minimizing the costs and energy demands so that the large scale production of iron carbide can be successfully implemented in a commercially viable manner.

DISCLOSURE OF THE INVENTION

The present invention provides an advantageous process of producing iron carbide from iron oxide containing feed stock in a fluid bed reactor. The reduction of the iron oxide containing feed stock to iron carbide ($Fe_3C$) proceeds in accordance with the following reaction sequence:

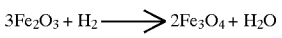

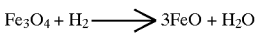

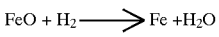

The foregoing reduction to iron carbide is accomplished by action of a reactant gas on the iron oxide feed. The reactant or "process" gas comprises a reducing gas and a carburizing gas. The reducing gas is generally hydrogen, although under appropriate conditions carbon oxides or hydrocarbon gases can act in a reducing capacity. The preferred carburizing gas is methane, although other hydrocarbon gases may also function as a carburizing gas. Ignoring for the moment diluent gases such as nitrogen, the foregoing combination of iron oxides and reactant gases results in a sequential set of reactions to the solid phase which produces a gas phase composed of five component gases, namely hydrogen ($H_2$), methane ($CH_4$), carbon dioxide ($CO_2$), carbon monoxide (CO), and water ($H_2O$) in contact with the solid phase. Carbon monoxide, hydrogen, carbon dioxide, methane and water, when in equilibrium, are related as follows:

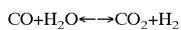

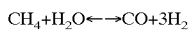

If the solid phase iron oxide is in equilibrium with any iron in the system, then the following relation applies:

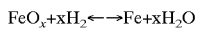

Moreover, if iron carbide is also in equilibrium, this can be expressed by the relation:

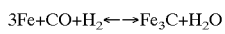

If the three solid components, Fe, $FeO_x$ and $Fe_3C$ are present in the solid phase and use is made of the ideal gas laws, there are then five equations for the five components in the gas phase and the component values become a determined and calculable set. Depending on the temperature and pressure, the gas composition may favor the production of iron carbide. However, sometimes even minor shifts in temperature and pressure can result in an equilibrium gas composition that favors the production of products other than iron carbide, as can be determined from known free energy of formation relationships, or can otherwise render the reaction inefficient and unsuitable for commercial operation. For example, if the temperature is too high the reactants can agglomerate, thereby slowing the reaction and damaging the equipment. Similarly, if water is inadvertently introduced into the system, the reaction will be unduly slow. By controlling the temperature and pressure in the reactor, the relative concentrations of each component gas in equilibrium in the system can be determined and hence, the ability of the gas composition to reduce the iron oxide feed stock to iron carbide can be predicted and controlled.

The effect of changes in system pressure on the concentration of hydrogen are particularly important since it is the primary reducing gas and is involved in each reaction in the reduction sequence. At a given temperature, increases in absolute pressure of the gas will effect the relative amount of hydrogen in the five gas system. Up to a certain system pressure, which depends upon the reaction temperature, the mole fraction of hydrogen in the gas phase will increase with increasing gas pressure. However, there is a point in the system where further increases in absolute gas pressure will result in a decrease in the mole fraction of hydrogen in the gas phase. It has been stated in the prior art that operating the iron carbide reduction in close proximity of this pressure will result in the production of iron carbide, but that if the reaction is run at pressures in excess of about 1 atmosphere above the point at which the mole fraction of hydrogen begins to decrease, the process will result in unsatisfactory iron carbide production Surprisingly, it has been discovered that the process can be run with improved iron carbide production at pressures well in excess of the pressure at which the hydrogen mole fraction begins to decrease.

Accordingly, in one embodiment of the invention there is provided, in a process of producing iron carbide in a fluid bed reactor comprising introducing an iron containing reactor feed into a fluid bed reactor, contacting said feed in said reactor with a reactant gas comprising hydrogen gas and a carburizing gas to convert at least a portion of said feed to iron carbide, the conversion reaction being characterized as having a pressure at which the mole fraction of said hydrogen in said reactant gas will begin to decrease if the pressure is increased, an improvement comprising contacting said reactor feed with said reactant gas under a total gas pressure of from about 2 to about 12, preferably about 6 to about 12, and more preferably still at least about 5 atmospheres above said pressure at which said mole fraction of said hydrogen begins to decrease. Preferably, the reaction is carried out at from about 550° C. to 650° C.

In one aspect of the invention the reactant gas comprises hydrogen, methane, carbon monoxide and carbon dioxide, and the conversion reaction is conducted with said gases substantially in equilibrium. In another aspect of the invention the mole fraction of hydrogen in said reactant gas is at least about 2% greater than the equilibrium mole fraction for hydrogen in said reactor. Preferably, the mole fraction of hydrogen is at least about 4% greater than the equilibrium mole fraction for hydrogen in said reactor, and still more preferably, from about 4% to about 10% greater than the equilibrium mole fraction for hydrogen in said reactor.

In yet another embodiment, the process further comprises reacting the iron containing reactor feed in at least one additional fluid bed reactor, the additional reactor adapted to enable the control of at least one process parameter selected from temperature, pressure and reactant gas composition separately from the other said reactor.

Advantageously, the inventive process eliminates any need to generate phase stability diagrams and constantly adjust the various reaction parameters in order to modify the product being generated. Instead, in the preferred embodiment, the reaction parameters can be predetermined and set so that the system only requires means to ensure that the preset conditions are maintained. This should result in a simplified control methodology and facility design.

Many additional features, advantages and a fuller understanding of the invention will be had from the following detailed description of preferred embodiments and the accompanying drawings.

DETAILED DESCRIPTION OF THE PREFERRED EMBODIMENTS

Figure 1:
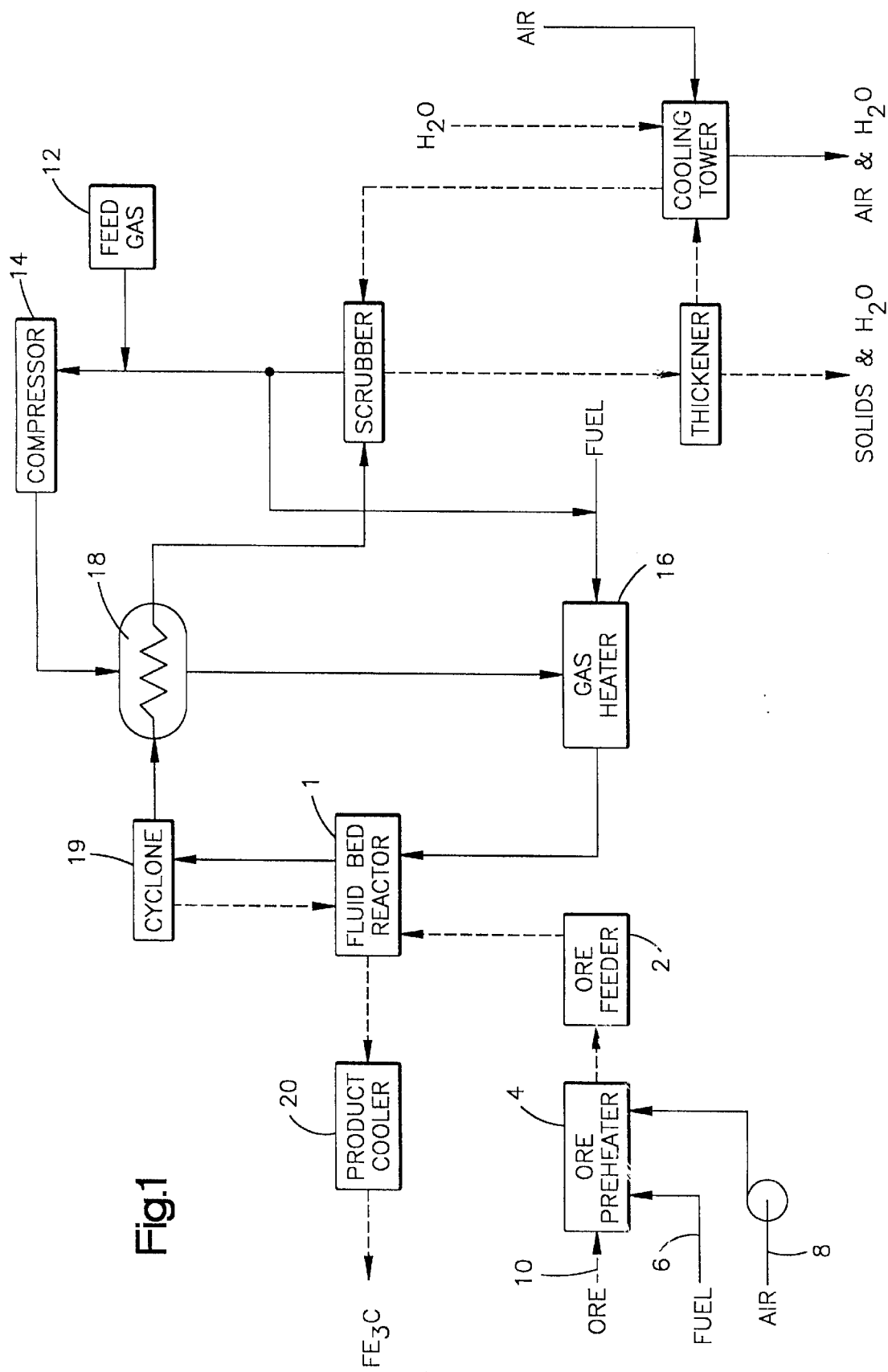
FIG. 1 is a schematic block flow diagram representing a process according to the invention.

Referring to FIG. 1, the iron carbide process according to the preferred embodiment may be generally described as follows. In FIG. 1, dotted arrows represent the movement of solids or liquids, and solid arrows represent the movement of gases. The iron ore feed stock is preheated to a temperature of from about 600° C. to 700° C. in a series of preheaters, such as cyclones, indicated schematically by box 4. Once the feed has obtained a suitable temperature it is introduced into a pressurized fluidized bed reactor 1 through a feeder 2, such as a lock hopper or other pressure adjustment device as is known in the art. The iron oxide reactor feed is continuously fed through the fluidized bed reactor 1 in this manner.

The basic construction of fluidized bed reactors is well known to those of ordinary skill in the art. Known reactors employ various baffle designs, bed sizes and the like. It is contemplated that any fluidized bed reactor adapted for the production of iron carbide is suitable for use in accordance with the present invention. The required reactor diameter and configuration is determined by a number of factors such as the plant design capacity, target product quality, the number of reactors to be used and the like, as would be known to those of ordinary skill in the art in view of the present disclosure. Preferably, the fluidized bed will be on the order of about 8 to about 16 feet deep for large scale commercial production. Moreover, the interior of the fluid beds will be preferably fitted with multiple vertical baffles to provide a circuitous path through the bed, thereby approximating a desirable plug flow as is known in the art. In the preferred embodiment, reactor 1 will be the first of at least two such reactors in series.

The average retention time for the material in the fluid bed will be on the order of from about 1 to about 15 hours, with the objective being to optimize the reaction conditions to minimize the retention time. However, the feed rate and retention time may vary in order to ensure suitable product quality in accordance with the preferred embodiment of the invention as discussed in more detail below. Once reacted, the product will be discharged from the reactor or reactors through another pressure adjustment device, such as a lock hopper or other arrangement, and stripped of the process gas. The iron carbide product is then transferred to a cooler 20 where the temperature of the iron carbide is lowered to below about 150° C. under an inert atmosphere to prevent reoxidation. Thereafter, the iron carbide product is shipped to users.

Since the overall reaction is endothermic it is necessary to introduce heat into the reactor by heating the process gas in addition to preheating the ore. This results in an operating temperature in the fluid bed itself of typically from about 550° C. to about 650° C. To this end, the fluidizing process gas will be introduced into the wind box (not shown) of the fluid bed at a temperature typically on the order of about 450° C. to about 650° C. after being heated in gas heater 16. In the reactor the hydrogen reacts with the oxygen contained in the feed stock to produce water, and the carbon from the methane, carbon monoxide and carbon dioxide combines with the iron in the feed stock to produce iron carbide according to the reaction sequence described above. The specific composition of the process gas is determined according to the preferred embodiments discussed in more detail below, but will comprise methane, hydrogen, carbon monoxide, carbon dioxide, water and nitrogen. Likewise, the desired gas pressure will be predetermined and maintained in accordance with the preferred embodiment discussed below.

After reacting with the feed stock the process gas exits the reactor to be cleaned and recycled. Any entrained solids in the gas will be removed with a cyclone 19 and returned to the fluid bed. The gas will then pass through a heat exchanger 18 where its heat will be recovered to help preheat the incoming process gas. The cooled gas from the heat exchanger will be scrubbed, for example in a packed tower, with cool water to remove the maximum amount of water from the gas. The clean, cool, scrubbed gas will then be combined with additional hydrogen and/or methane to return it to the desired composition, recompressed to the desired pressure by compressor 14 and passed through the heat exchanger to recover the heat in the process gas leaving the fluid bed. Thereafter, the process gas is heated in the gas heater and returned to the reactor.

In the preferred embodiment the iron oxide in the feed stock is essentially all hematite which is then preheated in a reducing atmosphere. Preferably, the iron oxide in the feed stock includes no more than 10%, and still more preferably no more than 5% magnetite. The particle size preferably ranges from about 100 to 1000 $\mu$m.

The preheating apparatus is preferably a preheating cyclone as is commonly used in the art. The preferred process can employ more than one preheater in series. Preferably, the preheating step is accomplished using at least three preheating cyclones. However, a reducing atmosphere may also be produced in known preheating kilns or similar apparatus. Accordingly, the specific preheating apparatus is not limited so long as a suitable reducing atmosphere can be employed in a manner that enables the feed to thereafter be introduced into the reactor in a suitable manner and at a suitable rate and temperature.

As in the case of the normal preheating practice, the preheating apparatus, shown schematically at 4 in FIG. 1, communicates with a fuel source 6 and an air or oxygen source 8 so that the fuel can be ignited to heat the feed stock 10 being introduced into the preheater. During the preheating process the feed stock is brought up to temperature in order to provide some of the heat necessary for the endothermic reactions occurring in the reactor vessel. Preferably, the feed stock is at a temperature of from about 600° C. to about 700° C. prior to entering the reactor. In a divergence from recognized practice, the oxygen or air supply is controlled such that the fuel is burned with less than a stoichiometric amount of oxygen. As a result, the fuel is starved for oxygen and scavenges oxygen from the feed ore, thereby reducing the hematite feed to magnetite and/or wustite while still in the preheater(s). The fuel may be any typical carbon based fuel known in the art, such as coal, oil and natural gas. The particular fuel used will depend significantly on availability and cost.

In the preheater, the stoichiometric relationship between the air and fuel will determine the conditions of the reducing atmosphere and its effect on the feed stock. In the preferred embodiment, the amount of oxygen supplied in the preheater is as close to stoichiometric amounts as possible while still reducing the feed. The specific stoichiometric conditions can be calculated or determined empirically by those of ordinary skill in the art in view of the instant disclosure. Since the reaction proceeds quickly, not all of the preheaters need to be run under a reducing atmosphere. In this instance, at least the preheater immediately preceding the reactor is run with the reducing atmosphere.

As a result of the preferred preheating process, the hematite feed stock is converted at least partially to magnetite and/or wustite prior to entering the reactor. Preferably, it is essentially completely reduced to magnetite. Surprisingly, this not only does not adversely effect the production of iron carbide, but it will actually improve the throughput by an estimated 5 to 10%. Moreover, it results in a ⅑ reduction of the hydrogen demand in the reactor, as determined stoichiometrically by the oxygen loss to reduce hematite to magnetite therein. Likewise, any wustite produced in the preheater brings with it an additional ⅓ savings on the oxygen demand. While not wanting to be bound by theory, this is possible because, even though the hermatite is reduced to magnetite in the preheater, it does not lose the advantageous reactivity associated with the physical structure of hematite. Thus, the advantages associated with hematite are at least to some extent maintained, while at the same time, work that would normally be required to be performed in the reactor is accomplished during the preheating steps.

Regardless of whether the feed is hematite which is advantageously preheated in a reducing atmosphere according to the foregoing preferred embodiment, or is any other suitable feed stock which may otherwise be preheated in the normal fashion, once inside the reactor the invention provides for advantageous reaction parameters suitable for converting the feed to iron carbide.

As discussed, the gas phase in the fluid bed reactor is comprised of five principal gases, namely hydrogen, carbon monoxide, carbon dioxide, methane and water, which inherently seek an equilibrium condition at the pressure and temperature in the reactor. The relative amounts of each of these component gases at equilibrium will change with changes in temperature and pressure. It has been observed that at a given temperature, the mole fraction of hydrogen in the reactant gas at equilibrium will increase with increasing pressure up to a certain point. Thereafter, the mole fraction of hydrogen will begin to decrease with further increases in pressure. The point at which the mole fraction of hydrogen begins to decrease is temperature dependent and will generally increase with increases in temperature in the reactor.

In a given system and at a given temperature the point at which the mole fraction of hydrogen will start to decrease, as well as the equilibrium gas composition, can be determined by those of ordinary skill in the art by well known thermodynamic calculations, empirical measurements or both. In any case, since hydrogen is a rate limiting reactant, it has been postulated that for a given temperature one must avoid operating the reaction at pressures much beyond the point at which the hydrogen mole fraction begins to decrease. However, it has been found that this is not the case. Thus, in the preferred embodiment, the reaction is run at pressures well in excess of the point at which the hydrogen mole fraction begins to decrease. Moreover, it has been found advantageous to artificially increase the volume fraction of hydrogen so that the reaction is run with a hydrogen content well above the equilibrium concentration for hydrogen for the particular temperature and pressure. Without wanting to be bound by theory, it is believed that this provides a driving force for the reaction as described in the reaction model below.

In practice, the preferred reaction temperature in the reactor is from about 500° C. to about 700° C., and most preferably from about 570° to 650° C. These reaction temperatures are obtained by preheating the feed to from about 600° C. to 700° C., and by heating the process gas in gas heater 16 to from about 450° C. to about 650° C.

At the foregoing temperatures, the pressure in the system is preferably at least about 2 atmospheres above the pressure at which the mole fraction of hydrogen begins to decrease. More preferably, the pressure is at least 4 atmospheres, and still more preferably from about 5 to about 12 atmospheres above the pressure at which the mole fraction of hydrogen begins to decrease. The desired system pressure is produced by compressor 14.

Under preferred conditions, and using the published free energy relations, one obtains equilibrium gas compositions exemplified by the following. At 550° C., the equilibrium partial pressures will preferably be on the order of about 0.0202 atm for CO, 0.0206 atm for $CO_2$, about 0.06 atm for $N_2$, in excess of 0.430 atm for $H_2O$, in excess of 1.885 atm for $H_2$, and in excess of 3.584 atm $CH_4$. At 600° C., the equilibrium partial pressures will preferably be on the order of about 0.072 atm for CO, 0.063 atm for $CO_2$, about 0.06 atm for $N_2$, in excess of 0.641 atm for $H_2O$, in excess of 2.409 atm for $H_2$ and in excess of 2.755 atm for $CH_4$. At 650° C. the equilibrium partial pressures will preferably be on the order of about 0.225 atm for CO, 0.172 atm for $CO_2$, about 0.06 for $N_2$, in excess of 0.852 atm for $H_2O$, in excess of 2.797 atm for $H_2$ and in excess of 1.995 atm for $CH_4$.

Still more preferably, the equilibrium gas compositions at various temperatures according to a preferred embodiment are exemplified by the following partial pressures. At 550° C., the equilibrium partial pressures will preferably be on the order of about 0.0202 atm for CO, 0.0206 atm for $CO_2$, about 0.08 atm for $N_2$, in excess of about 0.514 atm for $H_2O$, in excess of about 2.251 atm for $H_2$, and in excess of about 5.114 atm $CH_4$. At 600° C., the equilibrium partial pressures will preferably be on the order of about 0.072 atm for CO, 0.063 atm for $CO_2$, about 0.08 atm for $N_2$, in excess of 0.779 atm for $H_2O$, in excess of 2.930 atm for $H_2$ and in excess of 4.075 atm for $CH_4$. At 650° C. the equilibrium partial pressures will preferably be on the order of about 0.225 atm for CO, 0.172 atm for $CO_2$, about 0.08 for $N_2$, in excess of 1.065 atm for $H_2O$, in excess of 3.496 atm for $H_2$ and in excess of 2.961 atm for $CH_4$.

It is especially desirable to run the reaction at superequilibrium hydrogen concentrations. Moreover, since it is believed that hydrogen is a reaction species in all of the reactions in the series, and functions as a driving force in the reaction, it is preferable that the reaction be run with superequilibrium hydrogen concentrations even when the reaction is not run at pressures in excess of the point at which the mole fraction of hydrogen begins to decrease.

According to this embodiment, the concentration of hydrogen in the reaction gas mixture is increased to a concentration above its equilibrium concentration for the temperature and pressure of the reaction, Notably, the hydrogen gas concentration is increased above equilibrium concentration for a preset absolute pressure of the reaction system. Since the absolute system pressure of the reactant gas is determined primarily by the compressor 14, additional hydrogen gas can be added to the gas composition by gas feed 12 as it is recycled through the gas recycling system without increasing the total pressure. The reactant gas can then be heated to the desired temperature by gas heater 16 and fed to the reactor with an increased hydrogen concentration at the predetermined desired pressure. In this way, the absolute pressure of the system is maintained while at the same time the hydrogen concentration in the reactant gas is increased above its equilibrium concentration. Other arrangements for the introduction of reactant gases such as hydrogen or methane to increase the concentration of the individual gases without increasing the overall system pressure beyond the desired preset value would be apparent to those of ordinary skill in the art.

Preferably, the hydrogen concentration is increased at least 2% above the equilibrium concentration for hydrogen at the particular temperature and pressure of the reaction. Still more preferably, the hydrogen concentration is increased at least about 4%, and even more preferably from about 4% to about 10% above the equilibrium concentration for hydrogen. This is determined by determining the free energy equilibrium gas composition for a given temperature and pressure as is known in the art, and then selecting a suitable superequilibrium hydrogen value with which to run the reaction. For example, at 550° C., the equilibrium mole fraction of hydrogen in a CO, $CO_2$, $H_2O$, $H_2$, $CH_4$ and $N_2$ system will be approximately 0.363, 0.314 and 0.281 at 4, 6 and 8 atmospheres, respectively. At 600° C., the equilibrium mole fraction of hydrogen is approximately 0.451, 0.402 and 0.366 at 4, 6 and 8 atmospheres, respectively. Similarly, at 650° C. the equilibrium mole fraction of hydrogen is approximately 0.498, 0.466 and 0.437 at the respective pressures. In the practice of this embodiment, the hydrogen concentration is increased from the respective equilibrium amounts by, for example, 4%.

In the practice of the preferred embodiments, the desired reactor gas composition is predetermined by thermodynamic calculations and/or empirical observation for a desired preset temperature and pressure, and input into the control system for the facility, such as a computer. The desired operating conditions are then maintained by action of gas, pressure and temperature measuring and control apparatus commonly used in the industry. Once the desired parameters are determined, control of the product quality is effectuated by adjusting the feed rate and, hence, the residence time of the feed stock in the reactor. Given that the reaction parameters are determined at the outset, it is not necessary in the practice of the invention to generate equilibrium stability phase diagrams in order to correct deficiencies in the product. In the preferred embodiment, only adjustments to the gas feed rates, temperature and pressure are made to keep them at their predetermined values for a given ore feed rate. By adjusting the ore feed rate, and thus the residence time in the reactor, the product quality can be adjusted by ensuring that feed stock is present in the reactor for a time sufficient to enable it to completely react under the predetermined conditions.

Product quality is the sum, over all particles leaving the bed at any instant, of the degree of completion of the reaction in each particle, divided by the number of particles. This can be predicted by mathematical calculations. The necessary calculations would be known to those of ordinary skill in the art in view of this disclosure. In particular, using a process kinetics model (a mathematical derivation of the process kinetics for computing the percent of iron converted to iron carbide as a function of time), one can compute the predicted overall product composition that will be produced for a given residence time, a given particle size distribution and under specific process conditions. Thus, the necessary residence time to obtain a desired product material for a particular reactor size and design can be predetermined for a given feed and process. One model suitable for use as a process kinetics model in accordance with the present invention is the so called "Shrinking Unreacted Core Model for Spherical Particles of Unchanging Size (SCM)" disclosed in Levenspiel, *Chemical Reaction Engineering,* 2nd Ed., Wiley & Sons (1972), incorporated herein by reference.

In applying such a model the equilibrium gas composition of the reactant gas is determined as discussed above using published Free Energies of reaction. Then τ, the total time for completion of the reaction in a particle can be determined. The value of τ will depend upon whether the reaction of the particle has progressed to the point where diffusion of the reactant gas through the ash layer of the particle has begun to control, or whether the reaction rate controls. Due to the small size of the particles, the reaction rate will control most of the time. However, while not wanting to be bound by theory, at high pressures ash layer diffusion can begin to control. In the preferred embodiment, the process will be preferably run at temperatures and pressures where the reaction rate controls. Under such conditions τ is given by the relation:

$$\tau = \rho_B R / b k_s C_{Ag}$$

where $\rho_B$ is the molar density of reactant B in the solid phase, in this case hematite or magnetite, R is the radius of the particle, b is the moles of solid reactant B divided by moles of gaseous reactant A, $k_s$ is the first order rate constant for the surface reaction of the particle, and $C_{Ag}$ is the concentration of reactant A in the gas phase. If k, is expressed in moles/cm² sec. atm., then $C_{Ag}$ will be equal to the partial pressure of A. For reversible reactions, the partial pressure of A is the difference between the actual partial pressure of A and the equilibrium partial pressure of A. The effect of diffusion through the ash layer is expressed by the relation:

$$\tau = \rho_B R^2 / 6 b D_e C_{Ag}$$

where $D_e$ is the effective diffusion coefficient of the gaseous reactant A through the ash layer.

The feed particles are broken into fractions based on size and a $\tau_i$ for each fraction is established in accordance with the foregoing. It is generally assumed that the particle size distribution in the bed is the same as the feed. Using this assumption, the average residence time t of each fraction is the equal to the weight amount of feed material W in the bed at any time divided by the feed rate F according to the following relation t=W/F. Summing the fractions as shown in Levenspiel establishes the average extent of conversion in the bed at time t.

Based on the foregoing calculations, or similar mathematical models that would be apparent to those of ordinary skill in the art in view of this disclosure, one can predict the necessary residence time required to obtain a suitable product. Given that the reaction parameters of temperature, pressure and process gas composition are preset into the system, one need only maintain the process conditions and control the feed rate, and hence residence time, to control the product quality.

The monitoring and maintenance of process conditions such as temperature, gas composition and pressure can be accomplished by suitable monitoring instruments such as gas analyzers, process gas sources, process gas compressors and the like as are commonly used in the art. The measurements and data from the various instruments are fed to a suitable computer or computers which can then maintain the preset process conditions, all as would be known to those of ordinary skill in the art in view of this disclosure.

In a preferred variation of the process according to the invention, at least two fluid bed reactors are used in series. Ideally, the system is constructed to enable separate control of the gas composition in each reactor, in particular the concentrations of hydrogen and methane. Even more preferably, the temperature and pressure for each reactor can also be separately controlled independent of each other reactor. In this way, one can alter the conditions in each reactor to favor the production of the optimum reaction products for the relative point of progression of the iron carbide process. For example, conditions in the first reactor can be set to favor aggressive reduction, while conditions in the second reactor can be set to favor carburization. In accordance with the preferred embodiment, the desired conditions for the respective reactors are preferably predetermined and maintained, with control of the product quality being governed by the residence time in each reactor.

To favor reduction in the first reactor, the hydrogen concentration, temperature and pressure will likely be relatively high. By contrast, in order to favor carburization in the second reactor, the carbon level will be relatively high. The temperature and pressure may also be varied in the second reactor. The reaction conditions in the first reactor may be as previously described in the context of a single reactor. Preferred conditions in the first reactor are characterized by an absolute pressure of from about 4 to 15 atmospheres, and a temperature ranging from about 550° C. to 650° C., and still more preferably from about 600° to 650° C. The hydrogen content will preferably be at least about 2%, and still more preferably at least about 4% above the equilibrium concentration for hydrogen at the temperature and pressure in the reactor.

Although it depends upon how much reduction was accomplished in the first reactor, the second reactor will preferably be run at an absolute pressure and temperature in order to favor carburization. However, conditions in the second reactor need not differ from those in the first. Thus, in the second reactor the pressure may preferably be from about 4 to 15 atmospheres, and a temperature on the order of 550° C. to 650° C. In the preferred embodiment, the pressure in the second reactor is the same or slightly lower than the pressure in the first reactor. The most significant variation from the conditions in the first reactor will be in the gas composition, which is preferably adjusted to increase the carbon content. In a manner analogous to the use of superequilibrium concentrations of hydrogen, the concentration of $CH_4$ may be run above its equilibrium concentration in the second reactor. Although the concentration of other carbon bearing gases, such as CO, could also be increased, this would tend to also require an increase in hydrogen in the second reactor. Accordingly, increasing the concentration of methane is preferred. In the preferred embodiment, the concentration of methane in the second reactor is at least about 2%, and still more preferably at least about 4%, above the equilibrium concentration for methane at the particular temperature and pressure in the reactor.

Figure 2:
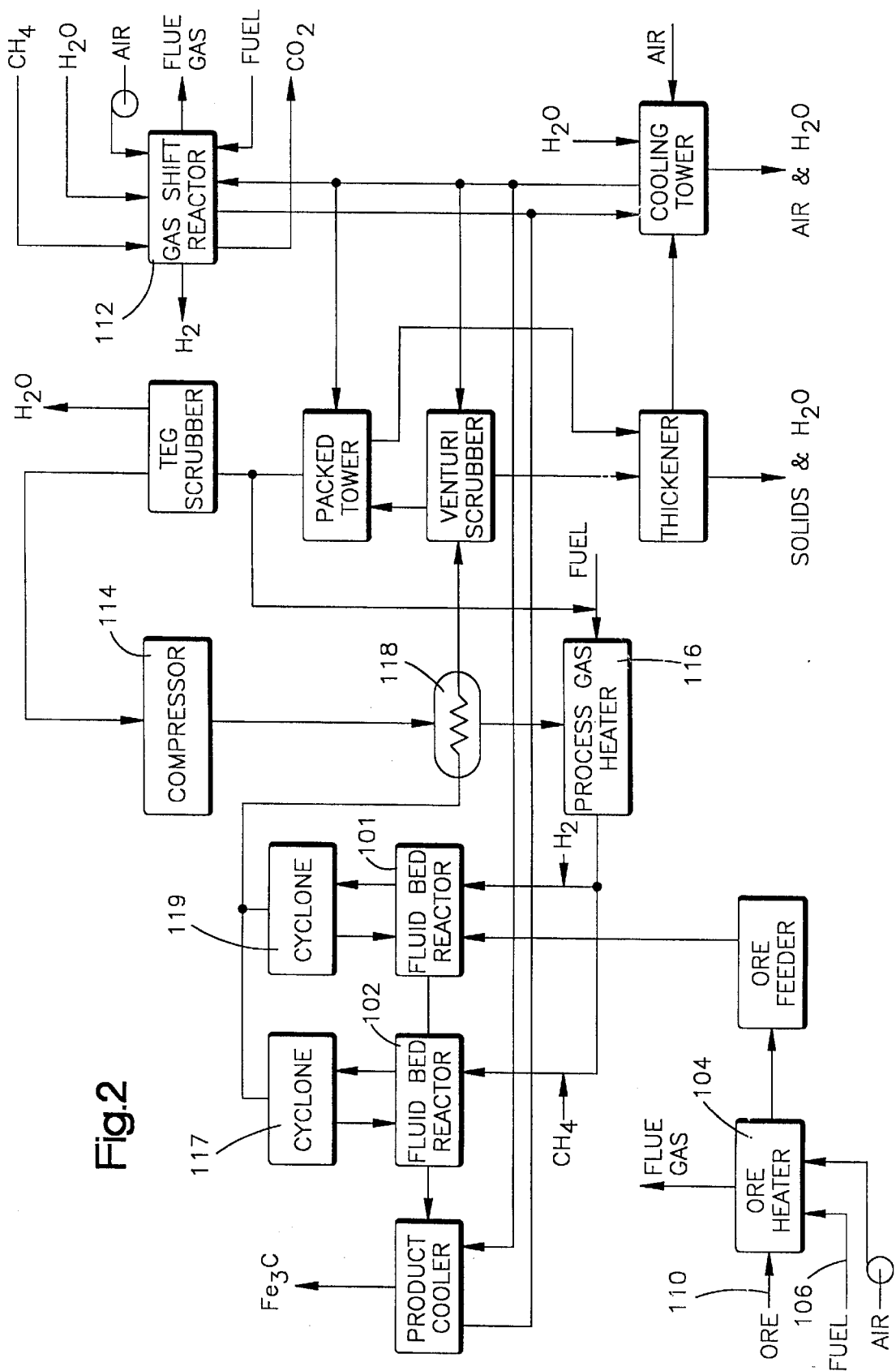
FIG. 2 is a schematic block flow diagram representing a series reactor arrangement according to the invention.

FIG. 2 shows a schematic block diagram of a series reactor system suitable for implementation of this preferred embodiment. As seen in FIG. 2, the iron ore feed stock may be preheated in ore preheater 104 in the normal fashion, or in a reductive atmosphere as previously described herein, and fed to the first reactor 101, where it is reacted under the desired conditions for the desired period of time. From the first reactor the reduced feed stock is fed to the second reactor 102, where it will be reacted under the conditions suitable to reach the final iron carbide product. From the second reactor the iron carbide product is discharged and processed for shipment to customers in the normal fashion. As shown, each reactor has its own cyclone 117, 119 for reprocessing of process gas and return of entrained solids to the reactor. Other schemes might also be employed, for example, each reactor could vent to the same cyclone, or use multiple cyclones with solids being returned to only the first reactor.

As can be seen in FIG. 2, the process gas is recycled through heat exchanger 118, cleaned and scrubbed, combined with additional gases at 112, compressed at 114, heated at 116 and reintroduced to the reactors in an analogous manner to that in FIG. 1. As shown, from gas heater 116, the hydrogen and methane concentrations can be controlled independently in each of reactors 101, 102, respectively. Notably, the embodiment shown in FIG. 2 does not employ two entirely separate gas supply and recycling systems. The important aspect of the preferred embodiment is that at least one of the reaction parameters of temperature, pressure and process gas composition can be separately controlled for each reactor. As would be apparent to those of ordinary skill in the art in view of this disclosure, this could be accomplished in many ways. As shown, the first reactor 101 has means to independently increase the concentration of hydrogen, whereas the second reactor 102 has means to independently increase the concentration of methane. In the preferred embodiment, the reactant gas composition, in particular the concentrations of hydrogen and/or methane therein, may be increased without affecting the preset total system pressure. Although shown in FIG. 2 as a single process gas heater step 116, in practice there may be a plurality of process gas heaters which may communicate separately with each reactor. In this way, the temperature in each reactor may be independently controlled. Likewise, although FIG. 2 indicates a single compressor 114, a plurality of compressors may be employed in order to provide independent control of the system pressure in each of the reactors 101, 102. It is to be understood that the particular form shown in FIG. 2 is intended to be representative of one possible process and is not to be considered limiting. For example, if economics permit, the system could be run with an entirely separate gas supply and recirculation system for each reactor.

The use of two reactors in series as described will result in a higher quality product because less unreacted ore feed will report directly to the discharge and no back mixing of fully converted material from one reactor to the other will occur. Moreover, by independently controlling the conditions in each reactor to favor the prominent reaction at that point in the progression of the reduction process, the conversion to iron carbide should proceed more completely with significant improvements in efficiency and reactant utilization.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A process for producing iron carbide in a fluid bed reactor comprising:
    (a) preheating an iron-containing feed material comprising hematite in a reducing atmosphere to produce a reduced iron-containing reactor feed,
    (b) introducing said reduced iron-containing reactor feed into a fluid bed reactor,
    (c) contacting said feed in said reactor with a reactant gas comprising hydrogen, methane, carbon dioxide, carbon monoxide and water to convert at least a portion of said feed to iron carbide, and
    (d) contacting said reactor feed with said reactant gas under a total gas pressure of at least 8 atmospheres and at a temperature in the range from about 550° C. to 650° C.

2. The process according to claim 1 wherein said hematite is essentially completely reduced to magnetite.

3. The process according to claim 1 wherein said reactor feed has a particle size ranging from about 100 to 1000 microns.

* * * * *